United States Patent [19]

Koblinski et al.

[11] Patent Number: 5,034,448

[45] Date of Patent: Jul. 23, 1991

[54] SLIP COMPOSITION FOR WHITEWARE ARTICLES

[75] Inventors: Brian D. Koblinski, Missouri City; Alan P. Croft, Lake Jackson; Alfredo C. Tamez, Angleton, all of Tex.

[73] Assignee: The Dow Chemical Company, Midland, Mich.

[21] Appl. No.: 500,622

[22] Filed: Mar. 28, 1990

Related U.S. Application Data

[60] Division of Ser. No. 200,815, Jun. 1, 1988, Pat. No. 4,915,890, which is a continuation-in-part of Ser. No. 97,883, Sep. 17, 1987, abandoned.

[51] Int. Cl.$^5$ ................................. C08K 3/08
[52] U.S. Cl. ..................... 524/447; 524/446; 524/253; 524/275; 524/299; 501/141
[58] Field of Search .............. 501/141; 524/446, 447, 524/253, 275, 299

[56] References Cited

U.S. PATENT DOCUMENTS

| | | | |
|---|---|---|---|
| 1,977,698 | 10/1934 | Scott | 25/156 |
| 2,033,480 | 3/1936 | Murphy | 264/86 |
| 2,320,009 | 5/1943 | Ralston et al. | 106/72 |
| 2,607,753 | 8/1952 | Adams | 524/160 |
| 2,899,324 | 8/1959 | MacArthur | 106/72 |
| 2,982,665 | 5/1961 | Wilcox | 264/86 |
| 2,985,609 | 5/1961 | Plitt | 524/253 |
| 3,080,256 | 3/1963 | Bundy | 117/72 |
| 3,172,182 | 3/1965 | Assmann | 25/98 |
| 3,248,245 | 4/1966 | Hodge | 524/253 |
| 3,298,849 | 1/1967 | Dohman et al. | 106/288 |
| 3,309,211 | 3/1967 | Weiss et al. | 106/72 |
| 3,350,429 | 10/1967 | Hasegawa et al. | 260/404 |
| 3,405,078 | 10/1968 | van der Greer | 524/253 |
| 3,418,401 | 12/1968 | Henry | 264/86 |
| 3,825,506 | 7/1974 | Carter | 260/2.5 L |
| 3,912,526 | 10/1975 | Clark | 106/55 |
| 3,917,778 | 11/1975 | Shiraki | 264/63 |
| 3,929,685 | 12/1975 | Jung | 260/2.5 HB |
| 3,956,217 | 5/1976 | Gazeley | 260/29.7 NR |
| 3,958,908 | 5/1976 | Schubart | 425/84 |
| 3,961,979 | 6/1976 | Abercrombie, Jr. | 106/308 N |
| 3,988,405 | 10/1976 | Smith et al. | 264/63 |
| 4,018,857 | 4/1977 | Schubart | 264/24 |
| 4,043,724 | 8/1977 | Schubart | 425/218 |
| 4,128,375 | 12/1978 | Schubart | 425/405 H |
| 4,133,626 | 1/1979 | Schubart | 425/405 H |
| 4,158,688 | 6/1979 | Pett et al. | 524/59 |
| 4,158,691 | 6/1979 | Schubart | 264/314 |
| 4,174,279 | 11/1979 | Clark et al. | 210/54 |
| 4,217,320 | 8/1980 | Ezis et al. | 264/65 |
| 4,270,890 | 6/1981 | Ottl | 425/150 |
| 4,330,250 | 5/1982 | Pinkas | 425/389 |
| 4,342,843 | 8/1982 | Perlinski et al. | 523/409 |
| 4,464,485 | 8/1984 | Kishima et al. | 521/64 |
| 4,482,307 | 11/1984 | Schaidl et al. | 425/78 |
| 4,482,381 | 11/1984 | Spitz et al. | 106/90 |
| 4,482,388 | 11/1984 | Crosbie | 106/287.1 |
| 4,518,341 | 5/1985 | Suffa | 425/405 H |
| 4,521,355 | 6/1985 | Kitajima | 264/86 |
| 4,591,472 | 5/1986 | Gerster | 264/87 |
| 4,659,483 | 4/1987 | Gries | 210/709 |
| 4,659,749 | 4/1987 | Sornik | 524/446 |

FOREIGN PATENT DOCUMENTS

0558606 6/1958 Canada ......................... 524/253
2035189 6/1980 United Kingdom .

OTHER PUBLICATIONS

Chemical Abstracts 85:165496j.
*Interceram*, vol. 1, pp. 33–35 (1987), Sacchiero, E., "Casting with Medium Pressure" Derwent 87-010982/02.

*Primary Examiner*—Joseph L. Schofer
*Assistant Examiner*—Peter D. Mulcahy
*Attorney, Agent, or Firm*—Paula Sanders Ruhr; Paul Hayhurst

[57] ABSTRACT

A casting process for the preparation of whiteware ceramic articles employs a polyalkylene polyamine, such as tetraethylene pentamine, as an additive to increase the casting rate. The additive can be employed, e.g., in slip casting, vacuum casting and pressure casting. Optionally, the additive includes a binder such as a styrene butadiene latex in an amount effective to maintain the green strength of the articles prepared in the casting process.

6 Claims, No Drawings

SLIP COMPOSITION FOR WHITEWARE ARTICLES

CROSS-REFERENCE TO RELATED APPLICATION

This is a divisional of application Ser. No. 200,815, filed June 1, 1988, now U.S. Pat. No. 4,915,890, which is a continuation-in-part of co-pending application, Ser. No. 97,883, filed Sept. 17, 1987 now abandoned.

BACKGROUND OF THE INVENTION

The present invention relates to a method of forming a whiteware cast article and to compositions useful therein.

Slip casting is an ancient art. In the practice of this art, a particulate material is suspended in a slip medium to form a slip. The slip is poured into a mold typically made of plaster of paris. The slip medium is drawn out of the casting slip and a cast is left behind in the mold. The mold and cast are separated and the cast article is processed to give the final properties desired in the cast article. Slip casting is employed in the manufacture of whiteware including sanitary ware, such as sinks and toilets.

Pressure casting is a relatively recent modification of slip casting. In pressure casting, pressure is used to drive liquid out of the slip. Polymeric molds are commonly employed rather than the plaster molds useful in ordinary slip casting. For examples, see U.S. Pat. Nos. 4,464,485; 3,929,685; and 3,825,506.

While slip casting and pressure casting are both techniques well-known in the art, there are some problems associated with casting processes and the articles produced therefrom and attempts have been made to use various casting additives to correct some of these problems.

It would be desirable to have an additive for casting which would be of low molecular weight, would have good burnout characteristics, and would give higher casting rates without significantly adversely impacting the other casting properties of the slip. It would be further desirable to have such an additive which would maintain the green strength of the cast article.

SUMMARY OF THE INVENTION

In one aspect, the present invention is an improved process for the preparation of whiteware ceramic articles employing such a casting additive. The process, which comprises preparing a slip from a particulate material and a slip medium, placing the slip into a mold, removing a portion of the slip medium through the mold and recovering a cast article, is improved by employing a slip comprising a polyalkylene polyamine in an amount effective to increase the casting rate.

In another aspect, the invention is a slip composition comprising: a slip medium; a particulate material; an amount of a polyalkylene polyamine, having an average molecular weight of less than about 1,000, which is effective to increase the casting rate of articles cast from the slip composition; and, optionally, a binder in an amount sufficient to maintain the green strength of articles prepared from the slip composition.

In a third aspect, the invention is an additive, useful in the preparation of whiteware ceramic articles, consisting essentially of a polyalkylene polyamine, a binder and water which may be added to a slip composition.

Surprisingly, the use of a polyalkylene polyamine improves the casting rate without significantly adversely impacting the rheology of the slip.

DETAILED DESCRIPTION OF THE INVENTION

The process of the present invention advantageously employs a slip composition comprising a particulate material, a slip medium, a polyalkylene polyamine and, optionally, a binder. The slip composition will also preferably comprise a dispersant and additional additives. The process can be a slip casting, vacuum casting or pressure casting process, and is applicable to all casting methods.

The particulate material can be any particulate substance which can be suspended in a slip medium and then cast into a cast whiteware article. Whiteware articles include sanitary ware such as sinks and toilets, china, artware and giftware. Preferred particulate materials include clay materials. Examples of preferred materials include ball clays, kaolin clays, feldspar, flint and the like. Mixtures of particulate materials can be employed. Several particulate materials are well-known to those familiar with the art of casting whiteware ceramic articles.

The slip medium serves to suspend the particulate material until it can be cast. Typically, the slip medium is a liquid and can be organic, inorganic, or a mixture thereof. Several slip media are well-known to those skilled in the art of slip casting. Examples of slip media include alcohols, hydrocarbons, chlorinated hydrocarbons and water. The preferred slip medium is water. The particulate material can be employed in any amount which will result in a cast article. Typically, the amount of particulate material employed is from about 5 to about 95 weight percent based on the weight of the slip. Preferably, the amount of particulate material employed is from about 25 to about 90 weight percent. However, the slip composition can vary widely and can contain more or less particulate material. Mixtures of slip media can be employed.

Polyalkylene polyamines are well-known compounds. For the purposes of the present invention, it is preferred to employ a polyalkylene polyamine having an average molecular weight of less than about 1,000, more preferably less than about 800. Examples of polyalkylene polyamines include ethylenediamine, triethylenetetramine, tetraethylenepentamine, pentaethylenehexamine, hexaethyleneheptamine, piperazine, aminoethylpiperazine, propylenediamine, butylenediamine, pentamethylenediamine, hexamethylenediamine, diethylenetriamine, dipropylenetriamine, dibutylenetriamine, bis(pentamethylene)triamine, bis(hexamethylene)triamine, tripropylenetetramine, tris(hexamethylene)tetramine, tetrapropylenepentamine, tetrabutylenepentamine, tetrakis(pentamethylene)pentamine, tetrakis(hexamethylene)pentamine, pentapropylenehexamine, pentabutylenehexamine, pentakis(pentamethylene)hexamine, pentakis(hexamethylene)hexamine, bis(aminopropyl)ethylenediamine, bis(aminopropyl)diethylenetriamine, tris(aminopropyl)ethylenediamine, and the like. The preferred polyalkylene polyamines generally have the formula:

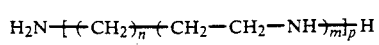

wherein n can be from zero to about 6, m can be from 1 to about 6, and p can be from 1 to about 15, with the proviso that n and m can vary independently within a molecule from one repeating unit to the next. Preferably, n is zero, p is 1 and m is from about 3 to about 6.

Thus, preferred polyalkylene polyamines for use in the practice of this invention include ethylene polyamines. It is also preferred that the ethylene polyamines used have an average molecular weight greater than about 150 and less than about 800. Examples of preferred polyalkylene polyamines include triethylenetetraamine, tetraethylenepentamine, pentaethylenehexamine, hexaethyleneheptamine and mixtures thereof.

The polyalkylene polyamine additives of this invention may be used individually or mixtures of polyalkylene polyamines may be used. For example, some polyalkylene polyamines such as triethylenetetraamine and tetraethylenepentamine (hereinafter TEPA) are generally available commercially only as a mixture of isomers having similar boiling points. Also suitable for use in the practice of this invention are mixtures of isomers having similar boiling points and higher molecular weights up to about 800. In addition to the linear isomers of the polyalkylene polyamines, branched and cyclic isomers of these compounds may also be employed.

The polyalkylene polyamine is employed in an amount which is effective to increase the casting rate of the slip relative to a slip which is identical except for the presence of the polyalkylene polyamine. Preferably, the polyalkylene polyamine is employed in an amount which is from about 0.0001 to about 1 percent of the weight of the slip. More preferably, the amount of polyalkylene polyamine is from about 0.05 to about 0.5 percent of the weight of the slip. Most preferably, the amount of polyalkylene polyamine is from about 0.1 to about 0.3 percent of the weight of the slip.

A binder is optionally employed in the process of the present invention. The binder serves to maintain or improve the green strength of the cast article. Examples of preferred binders include latexes such as styrene-butadiene latexes, acrylic latexes, ethyleneacrylic acid latexes, lignosulfonates, polyvinylalcohols, alkanolamines and other binders known in the art. Styrene-butadiene latexes are more preferred. When a binder is employed, it is employed in an amount sufficient to maintain or improve the green strength of the cast article relative to an article cast from a slip which is identical except for the presence of the binder. Preferably, the amount of binder is from about zero to about 30 percent of the weight of the slip. More preferably, the amount of binder employed is from about 0.05 to about 0.5 percent of the weight of the slip. Most preferably, the amount of binder employed is from about 0.1 to about 0.3 percent of the weight of the slip.

The ratio of polyalkylene polyamine to binder, when a binder is used, is any which will result in a slip composition from which a whiteware ceramic article may be produced at a faster cast rate and with a green strength comparable to the casting rate and green strength of an article prepared from a slip without the polyalkylene polyamine and binder. A preferred weight ratio of polyalkylene polyamine to binder is at least about 5:95 and no greater than about 95:5. It is more preferred that the weight ratio is at least about 30:70 and no greater than about 70:30. It is most preferred that the weight ratio of polyalkylene polyamine to binder is about 50:50.

The polyalkylene polyamine and the binder, when used, may be added to the slip composition separately. Alternatively, the polyalkylene polyamine and binder may be mixed together, optionally with water, and added to the slip composition at once. When the polyalkylene polyamine and binder are mixed together before being added to the slip composition, it is preferred to mix the two components by preparing separate aqueous solutions of the binder and the polyalkylene polyamine and adding the amine solution to the binder solution with stirring. When mixed with water, the weight ratio of active ingredients, i.e., polyalkylene polyamine and binder to water is preferably about 1:1. However, other ratios may be used.

Other additives which are well-known in the art of slip casting are also typically employed. Examples of additional additives include soda ash, calcium sulfate, and dispersants. Dispersants useful in the practice of this invention are those known to one skilled in the art of whiteware ceramic casting. A non-limiting example of such a dispersant is sodium silicate.

The casting process of the present invention can be practiced using the conditions commonly employed in the art of slip casting and pressure casting. Typically, slip casting is conducted at ambient temperature, although temperatures of from about 5° C. to about 95° C. can be employed if desired. Typically, pressure casting is conducted at temperatures of from about ambient temperature up to about 100° C. or higher. Ambient temperature is preferred from the standpoint of convenience and low cost. Casting can be conducted at superatmospheric pressure, atmospheric pressure, subatmospheric pressure, and combinations of these as is well-known in the casting art.

The casting process of the present invention can be practiced by introduction of the polyalkylene polyamine and, optionally, the binder into the slip. Typically, this introduction is made early in the process of slip preparation. Preferably, the addition to the slip medium of the polyalkylene polyamine and, optionally, the binder occurs prior to addition of the particulate material.

The slip casting techniques employed in the process of the present invention are those which are well-known in the slip casting art. For examples of slip casting methods, see U.S. Pat. Nos. 4,217,320 and 4,482,388, the teachings of which with respect to slip casting are incorporated herein by reference. Additionally, see GB 2,035,189A. Similarly, the pressure casting techniques employed are those which are known in the pressure casting art. See, e.g., U.S. Pat. Nos. 4,591,472 and 4,659,483, the teachings of which with respect to pressure casting are incorporated herein by reference.

SPECIFIC EMBODIMENTS OF THE INVENTION

The following examples are given to illustrate the invention and should not be construed as limiting its scope. All parts and percentages are by weight unless otherwise indicated.

SLIP PREPARATION PROCEDURE

A 16-ounce polyethylene bottle containing ten alumina balls is placed on a top-loading balance and tared. To this bottle are added the following solutions in amounts needed to give the concentrations of additive in the final slip, given in parentheses: 1.0 percent sodium silicate solution (745 ppm sodium silicate), 1.0 percent soda ash solution (120 ppm soda ash), 0.167 percent calcium sulfate solution (150 ppm calcium sulfate) and 50.0 percent amine (or amine/binder) additive solution. Deionized water is then added until the bottle contains the appropriate quantity of water plus additives (56.2 g total water plus additives). The bottle is removed from the balance, is capped and is shaken vigorously by hand. Then, 153.6 g of Kentucky-Tennessee ball clay is added, and the bottle is capped and shaken vigorously until the contents appear to be mixed uniformly. Similarly, 94.2 g of kaolin clay, 131.4 g of feldspar, and 58.8 g of flint are added to the bottle separately, and each addition is followed by vigorous shaking by hand. If the powders appear to cake on either the sides or the top of the bottle, a spatula is used to loosen the caked area and the bottle is shaken further. When all ingredients are added and moistened (total 600 g), the bottle is placed on its side in a mechanical shaker (side to side action) and allowed to shake for 30 minutes at high speed. The shaker is maintained at 35° C. The slip is 27 percent water and water-soluble additives. The remaining 73 percent of the slip consists of the four ceramic powders.

CASTING PROPERTIES TESTING PROCEDURE

Following the shaking, the bottle containing the slip is removed and a portion of the slip is poured into a 4-ounce wide mouth glass bottle. The viscosity of the slip is determined using a Brookfield Viscometer (Model LV, spindle 3, RPM 12, 35° C.), allowing the spindle to rotate a full minute before noting the dial reading. A shallow, open plaster of paris mold is used in the test. Casting is done at 35° C. Slip from the bottles is poured quickly into the mold until the depression is completely full and slip wells up above the confines of the mold. The slip is allowed to remain in the mold for two minutes, and then the mold is tilted and a stopwatch is started. The excess slip is allowed to drain. The time from tilt until the stream of slip ceases to be continuous and starts dripping (end drip) is recorded. Similarly, the time from tilt until the drops occur at five-second intervals is noted (five-second drip). Then the mold is again returned to the horizontal and placed on the bench, and the time from tilt until the surface is dry (no longer glossy) is noted (dry time). The cast ceramic body is immediately removed from the mold, after removing the excess that is the result of the pouring, and is weighed (cast weight). In each of the examples, the cast weight reported is weight of the cast article obtained when the article is allowed to cast two minutes. If the cast body sticks to the mold, that fact is noted.

GREEN STRENGTH TESTING PROCEDURE (MODIFICATION OF ASTM STD. C 689-80

The remaining slip is cast into a two-part bar mold. A working environment maintained at 35° C. is used for these casts as well. The bar mold produces six bars of the dimensions 0.5"×0.5"×3". After casting proceeds sufficiently, the six bars are demolded and allowed to dry overnight on the bench. The bars are then further conditioned by 6 hours at 60° C., followed by 24 hours at 110° C. The bars are then placed in a dessicator to cool. Twenty-four hours prior to testing, half of the bars are transferred to a constant humidity chamber (50 percent relative humidity-saturated sodium dichromate solution). Modulus of rupture (MOR) testing is accomplished with an Instron device (Model 1125) with the following settings: 1000 lb load cell, full scale load set to 50 lb; crosshead speed 0.05 inches/minute; support knives spaced at 2.0 inches. The modulus of rupture for both anhydrous and 50 percent humidity bars is calculated by the standard equation given in the ASTM standard.

The foregoing procedures are employed to obtain the results listed in the following Examples and Comparative Experiments.

COMPARATIVE EXPERIMENT 1

Not an embodiment of the present invention

Control—No additive is mixed in the slip. The test results are as follows:

| Add. Level (ppm) | Viscosity (cps) | Dry Time (sec) | Cast Wt (g) | Anhyd. MOR (psi) | 50% Hum MOR (psi) |
|---|---|---|---|---|---|
| 0 | 1050 | 77.8 | 53.4 | 326.1 | 262.1 |

EXAMPLE 1

Various levels of tetraethylene pentamine (TEPA) are added to the slip, with the following results:

| Add. Level (ppm) | Viscosity (cps) | Dry Time (sec) | Cast Wt (g) | Anhyd. MOR (psi) | 50% Hum MOR (psi) |
|---|---|---|---|---|---|
| 100 | 1200 | 76.6 | 49.6 | 312.6 | 271.6 |
| 500 | 1000 | 67.2 | 62.4 | 288.4 | 240.1 |
| 1000 | 1500 | 78.4 | 74.6 | 254.8 | 212.0 |
| 1200 | 3250 | 95.5 | 90.4 | 227.9 | 189.3 |
| 1500 | >10000(1) | | | | |
| 1700 | >10000(1) | | | | |
| 2000 | >10000(1) | | | | |

(1)Slip not castable

The addition of TEPA generally increases cast weight (compared to Comparative Experiment 1) obtained with a two-minute casting time which indicates an increased cast rate. Above a certain level of addition, slip viscosity is adversely affected.

EXAMPLE 2

Various levels (solids basis) of a styrene/butadiene latex are added to the slip, with the following results:

| Add. Level (ppm) | Viscosity (cps) | Dry Time (sec) | Cast Wt (g) | Anhyd. MOR (psi) | 50% Hum MOR (psi) |
|---|---|---|---|---|---|
| 100 | 1250 | 80.2 | 53.3 | 302.5 | 278.6 |
| 250 | 1400 | 79.8 | 54.1 | 327.5 | 289.9 |
| 500 | 1050 | 71.2 | 54.8 | 311.2 | 259.1 |
| 750 | 1250 | 78.2 | 56.8 | 348.8 | 283.0 |
| 1000 | 1650 | 87.7 | 56.8 | 356.1 | 285.3 |
| 1200 | 3500 | 82.7 | 66.8 | 336.1 | 276.2 |
| 1500 | 3750 | 90.0 | 64.8 | 391.7 | 275.7 |
| 2000 | 3850 | 92.6 | 68.2 | 395.0 | 319.3 |

When compared to Comparative Example 1, addition of styrene/butadiene latex alone has little effect upon viscosity until a level of 1200 ppm is attained. It should also be noted that the addition of the styrene butadiene latex has little effect on cast weight unless the viscosity is also substantially increased. Similarly, green strength is little effected.

EXAMPLE 3

A blend of 25 percent (solids basis) SB Latex 233A (a styrene/butadiene latex available commercially from The Dow Chemical Company), 25 percent TEPA, and 50 percent water is added to the slip at the level of 1000 ppm active basis (2000 ppm solution basis) with the following results:

| Add. Level (ppm) | Viscosity (cps) | Dry Time (sec) | Cast Wt (g) | Anhyd. MOR (psi) | 50% Hum MOR (psi) |
|---|---|---|---|---|---|
| 1000 | 1500 | 81.7 | 62.5 | 324.4 | 270.3 |

When a blend of TEPA and the latex is employed, cast weight is increased while the other casting parameters are held about constant (compared to Comparative Experiment 1).

EXAMPLE 4

Various polyethylene polyamines are added to the slip at 1000 ppm, with the following results:

| Add. ID | Viscosity (cps) | Dry Time (sec) | Cast Wt (g) | Anhyd. MOR (psi) | 50% Hum MOR (psi) |
|---|---|---|---|---|---|
| Ethylenediamine | 950 | 83.6 | 60.0 | 277.5 | 243.7 |
| Diethylenetriamine | 1750 | 76.8 | 78.0 | 261.6 | 205.6 |
| Triethylenetetramine | 2050 | 79.4 | 77.8 | 249.8 | 200.3 |
| Triethylenepentamine | 1500 | 78.4 | 74.6 | 254.8 | 212.0 |
| Ethyleneamine E-100① | 3500 | 92.3 | 90.8 | 228.8 | 179.1 |
| Piperazine | 600 | 75.5 | 54.0 | 301.8 | 253.1 |

①This is a blend of isomers having similar boiling points that is commercially available from The Dow Chemical Company.

When different polyalkylene polyamines are employed, cast weight and thus casting rate is seen to increase (compared to Comparative Experiment 1).

EXAMPLE 5

Various potential binder materials are added to the slip at 1000 ppm active, with the following results:

| Add. ID | Viscosity (cps) | Dry Time (sec) | Cast Wt (g) | Anhyd. MOR (psi) | 50% Hum MOR (psi) |
|---|---|---|---|---|---|
| AB Latex 233A | 1650 | 87.7 | 56.8 | 356.1 | 285.3 |
| Polyvinyl alcohol① | >10000④ | | | | |
| Nalco 101② | 400 | 71.5 | 40.8 | 362.3 | 234.7 |
| PRIMACOR ® 4990③ | 2450 | 100.0 | 58.5 | 323.6 | 231.9 |
| PRIMACOR ® 4983③ | 2900 | 103.8 | 58.3 | 296.9 | 241.9 |

①Molecular weight approximately 10,000.
②Nalco 101 is a lignosulfonate which can be obtained from the Nalco Chemical Company
③Primacor ® 4990 and Primacor ® 4983 are ethylene acrylic acid emulsions and are available commercially from The Dow Chemical Company
④Slip not castable Note that polyvinyl alcohols can be employed at lower concentrations or lower molecular weights to give slips of slip-castable viscosity.

When compared to Comparative Experiment 1, the binder SB Latex 233A demonstrates the most beneficial impact on green strength while maintaining a desirable viscosity.

EXAMPLE 6

Various levels of a blend of 15 percent (solids basis) SB Latex 233A, 35 percent TEPA, and 50 percent water are added to the slip. Additive levels are for the active ingredients. The following results are obtained:

| Add. Level (ppm) | Viscosity (cps) | Dry Time (sec) | Cast Wt (g) | Anhyd. MOR (psi) | 50% Hum MOR (psi) |
|---|---|---|---|---|---|
| 100 | 1100 | 75.0 | 54.7 | 342.9 | 249.8 |
| 500 | 1500 | 77.6 | 70.5 | 291.5 | 211.1 |
| 1000 | >10000① | | | | |
| 1200 | >10000① | | | | |
| 1500 | >10000① | | | | |
| 2000 | >10000① | | | | |

①Slip not castable

When the amine concentration is greater than the binder concentration, uncastable slips result at additive levels of 1000 ppm and above. At 500 ppm, a significant increase in cast weight is seen (compared to Comparative Experiment 1).

EXAMPLE 7

Various levels of a blend of 25 percent (solids basis) SB Latex 233A, 25 percent TEPA and 50 percent water are added to the slip. Additive levels are for the active ingredients. The following results are obtained:

| Add. Level (ppm) | Viscosity (cps) | Dry Time (sec) | Cast Wt (g) | Anhyd. MOR (psi) | 50% Hum MOR (psi) |
|---|---|---|---|---|---|
| 100 | 1350 | 74.3 | 57.9 | 327.7 | 268.0 |
| 500 | 1450 | 82.2 | 60.4 | 338.8 | 264.9 |
| 1000 | 1500 | 81.7 | 62.5 | 324.4 | 270.3 |
| 1200 | 1700 | 77.4 | 75.2 | 299.3 | 247.9 |
| 1500 | 4600 | 102.6 | 85.1 | 284.2 | 257.6 |
| 2000 | 3500 | 106.8 | 87.3 | 264.1 | 231.9 |

When the levels of amine and latex binder are balanced, higher additive levels can be employed before viscosity begins to increase (compare Example 6). The cast weight increase parallels the increase in additive level. At higher additive levels, green strength decreases slightly as viscosity begins to increase.

EXAMPLE 8

Various levels of a blend of 35 percent (solids basis) SB Latex 233A, 15 percent TEPA and 50 percent water are added to the slip. Additive levels are for the active ingredients. The following results are obtained:

| Add. Level (ppm) | Viscosity (cps) | Dry Time (sec) | Cast Wt (g) | Anhyd. MOR (psi) | 50% Hum MOR (psi) |
|---|---|---|---|---|---|
| 100 | 1350 | 81.2 | 56.9 | 312.7 | 246.6 |
| 500 | 1000 | 83.8 | 55.0 | 322.5 | 251.8 |
| 1000 | 2000 | 83.8 | 70.6 | 279.8 | 262.4 |
| 1200 | 1800 | 80.3 | 74.2 | 297.6 | 251.8 |
| 1500 | 2950 | 86.5 | 77.8 | 316.5 | 251.1 |
| 2000 | 3200 | 93.3 | 82.8 | 314.4 | 248.4 |

The concentration of the latex binder is in excess relative to the amine, and the trend in cast weight is similar to that seen in Example 7.

EXAMPLE 9

Various levels of a blend of 40 percent (solids basis) SB Latex 233A, 10 percent TEPA and 50 percent water are added to the slip. Additive levels are for the active ingredients. The following results are obtained:

| Add. Level (ppm) | Viscosity (cps) | Dry Time (sec) | Cast Wt (g) | Anhyd. MOR (psi) | 50% Hum MOR (psi) |
| --- | --- | --- | --- | --- | --- |
| 100 | 1450 | 87.3 | 57.1 | 310.4 | 244.4 |
| 500 | 1450 | 83.4 | 56.9 | 300.1 | 252.9 |
| 1000 | 1700 | 84.6 | 60.3 | 297.4 | 232.8 |
| 1200 | 1800 | 82.0 | 66.5 | 325.2 | 240.2 |
| 1500 | 2150 | 80.9 | 72.4 | 307.8 | 260.0 |
| 2000 | 2500 | 86.0 | 76.0 | 298.6 | 262.3 |

The effect of further increasing the binder level relative to the amine level is shown (compare Examples 7, 8 and 9).

EXAMPLE 10

Various levels of a blend of 25 percent (solids basis) Primacor 4990 (ethylene acrylic acid emulsion), 25 percent TEPA and 50 percent water are added to the slip. Additive levels are for the active ingredients. The following results are obtained:

| Add. Level (ppm) | Viscosity (cps) | Dry Time (sec) | Cast Wt (g) | Anhyd. MOR (psi) | 50% Hum MOR (psi) |
| --- | --- | --- | --- | --- | --- |
| 100 | 1800 | 80.6 | 60.0 | 280.0 | 248.0 |
| 500 | 3850 | 103.6 | 73.2 | 275.7 | 219.3 |
| 1000 | 2700 | 90.6 | 76.2 | 242.0 | 181.7 |
| 1200 | 2950 | 77.8 | 80.5 | 216.0 | 191.7 |
| 1500 | 3700 | 96.9 | 84.3 | 221.8 | 191.5 |
| 2000 | 8000 | 120.8 | 102.7 | 192.7 | 180.6 |

Use of the ethylene acrylic acid emulsion/amine blend as a slip additive gives increased cast weight. However, the SB Latex blend is superior to this blend in overall properties (compare Examples 7 and 10).

COMPARATIVE EXPERIMENT 2

Not an embodiment of the present invention

Various levels of a blend of 25 percent monoethanolamine, 25 percent TEPA and 50 percent water are added to the slip. The following results are obtained:

| Add. Level (ppm) | Viscosity (cps) | Dry Time (sec) | Cast Wt (g) | Anhyd. MOR (psi) | 50% Hum MOR (psi) |
| --- | --- | --- | --- | --- | --- |
| 100 | 1600 | 89.9 | 56.2 | 270.7 | 212.0 |
| 500 | 1200 | 92.6 | 51.6 | 260.3 | 244.0 |
| 1000 | 600 | 80.2 | 47.0 | 262.8 | 250.3 |
| 1200 | 500 | 77.6 | 49.7 | 281.6 | 235.5 |
| 1500 | 450 | 76.7 | 49.8 | 246.8 | 235.2 |
| 2000 | 400 | 73.9 | 51.2 | 209.8 | 222.0 |

When compared to slips prepared with a polyalkylene polyamine (Example 1) or a polyalkylene polyamine/binder blend (Example 7), slips containing the polyalkylene polyamine/alkanolamine blend exhibited inferior casting and strength properties.

EXAMPLE 11

Various levels of a blend of 25 percent ethylenediamine, 25 percent TEPA and 50 percent water are added to the slip. The following results are obtained:

| Add. Level (ppm) | Viscosity (cps) | Dry Time (sec) | Cast Wt (g) | Anhyd. MOR (psi) | 50% Hum MOR (psi) |
| --- | --- | --- | --- | --- | --- |
| 100 | 2000 | 83.2 | 60.0 | 264.2 | 228.0 |
| 500 | 2800 | 95.6 | 66.1 | 273.3 | 217.6 |
| 1000 | 1500 | 94.5 | 62.4 | 242.4 | 215.5 |
| 1200 | 1050 | 83.7 | 62.7 | 221.0 | 192.8 |
| 1500 | 800 | 87.7 | 62.2 | 205.0 | 172.2 |
| 2000 | 700 | 86.6 | 62.7 | 210.9 | 197.6 |

A mixture of two polyalkylene polyamines is employed.

EXAMPLE 12

Clay slips with a final solids content of 73 percent by weight are prepared for casting evaluation. The exact compositional makeup of the solids portion is listed below in weight percent:

| | |
| --- | --- |
| Kentucky-Tennessee Ball Clay | 35 |
| Georgia Kaolin Clay | 21.5 |
| Feldspar | 30 |
| Flint | 13.5 |

The balance of the slip is composed of distilled water, calcium sulfate, sodium silicate deflocculant, soda ash and TEPA as the test amine. To prepare the slip, the water, silicate, ash, sulfate and test amine are charged to an 8-ounce polyethylene bottle containing five alumina balls. The amine compound is added to the water prior to the addition of any of the solid ingredients. In this manner, the amine will not gel the slip. Each solid ingredient is then added separately, starting with the ball clay, with shaking of the bottle's ingredients after each ingredient addition. After all of the slip ingredients are added, the bottle is placed on a mechanical shaker for 30 minutes of high speed mixing.

At the end of the 30-minute period, the slip is poured into a 4-ounce, wide mouth glass jar. A Brookfield LVT Viscometer with a number three spindle and a rotational speed of 12 rpm is used to measure the viscosity at 70° F. A casting test involving a plaster mold is used to assess the casting rate. The slip is allowed to cast for a two-minute period. The results below illustrate the activity of a polyalkylene polyamine. In this example, the amine-treated slip is treated with a preferred level of amine.

| Test Slip | Slip Viscosity | Cast Weight |
| --- | --- | --- |
| Control | 1700 cps | 54.8 g |
| 0.10% TEPA | 1930 cps | 75.3 g |

SLIP PREPARATION PROCEDURE (PRESSURE CASTING)

An 8-ounce polyethylene bottle containing 5 alumina balls is placed on a top-loading balance and tared. To this bottle are added quantities of the following solutions corresponding to the concentrations of additive in the final slip given in the Table below: 1.0 percent sodium silicate solution, 1.0 percent soda ash solution, 0.167 percent calcium sulfate solution, and 50.0 percent amine (or amine/binder) additive solution (identity and quantity as given in the Examples). Deionized water is then added until the bottle contains the appropriate quantity of water plus additives (94.5 g if slip contains 73 percent solids, 140.0 g if 60 percent solids, 164.5 g if 53 percent solids, and 189.0 g if 46 percent solids). The bottle is removed from the balance, capped and vigorously shaken by hand. Then the required amount (as shown in the Table) of Kentucky-Tennessee ball clay is added, and the bottle is capped and shaken vigorously until the contents appear to be mixed uniformly. Similarly, appropriate amounts (see the following table) of kaolin clay, feldspar, and flint are added, each followed by vigorous shaking by hand. If the powders appear to cake on either the sides or the top of the bottle, a spatula is used to loosen the caked area and the bottle is shaken further. When all ingredients are added and moistened (total 350 g), the bottle is placed on its side in a mechanical shaker (side to side action) and allowed to shake for 30 minutes at high speed.

|  | Percent Solids in Slip (Wt Basis) | | | |
| --- | --- | --- | --- | --- |
|  | 46 | 53 | 60 | 73 |
| Soda Ash (ppm) | 76 | 87 | 99 | 120 |
| Sodium Silicate (ppm) | 493 | 568 | 643 | 782 |
| Calcium Sulfate (ppm) | 95 | 109 | 123 | 150 |
| Ball Clay (%) | 16.1 | 18.6 | 21.0 | 25.6 |
| Koalin Clay (%) | 9.9 | 11.4 | 12.9 | 15.7 |
| Flint (%) | 13.8 | 15.9 | 8.0 | 21.9 |
| Feldspar (%) | 6.2 | 7.1 | 8.1 | 9.8 |

*Percentage of total slip - weight basis for each of the four types. Sum of the four percentages equals the approximate percent solids for the slip.

PRESSURE CASTING TESTING PROCEDURE

A Baroid High Pressure Filter Press is used in the testing. This device applies nitrogen pressure to the top of a slip column, which is resting on a filter paper. Application of the pressure forces the filtrate through the filter, to be collected in a 5 ml graduated cylinder below. The slip solids form a filter cake on the filter paper. When temperature and pressure are held constant, the time required for a certain quantity of filtrate to be collected is a good measure of ease of filtration. In cases where the testing is done at temperatures above ambient, the heating well (into which the cell body of the press is placed) is heated to the required temperature and maintained using a temperature controller.

The cell body is filled with one-third of the slip prepared as above. A filter paper is placed over the O-ring in the cell body. Then the support screen is placed flush side down over the filter paper. Another O-ring is placed on the cell cap, and the cell cap is fastened to the cell body. The cell body, containing the slip, is inverted and placed in the heating well. If heating is necessary, the slip is allowed to equilibrate for 30 minutes before proceeding. The nitrogen pressure is regulated to 25 psig, and the line connected to the top of the cell body. Both upper and lower valve stems to the cell body are opened, and a graduate is placed under the lower (outlet) stem. The nitrogen valve is opened and the timer started simultaneously. The time required for 3 ml of filtrate to be collected is noted. Following completion of the test, the cell is allowed to cool, and is depressurized and cleaned. The test is repeated twice to give three replications per slip. Test conditions and resulting data for the individual runs are given in the following Examples.

COMPARATIVE EXPERIMENT 3

Not an embodiment of the present invention

Control—No amine additive is mixed in the slip. Temperature and filter size are varied. The test results are as follows:

| Add. ID | Add. Level (ppm) | % Solids (wt) | Temp (°C.) | Filter Size (Microns) | Filtration Time (sec) |
| --- | --- | --- | --- | --- | --- |
| — | 0 | 73 | 20 | 0.22 | 1365 |
| — | 0 | 73 | 20 | 0.45 | 1357 |
| — | 0 | 73 | 35 | 0.22 | 1095 |
| — | 0 | 73 | 35 | 0.45 | 1126 |
| — | 0 | 73 | 50 | 0.22 | 812 |
| — | 0 | 73 | 50 | 0.45 | 769 |

EXAMPLE 13

Tetraethylenepentamine is added to the slip with the following results (temperature and filter size are varied):

| Add. ID | Add. Level (ppm) | % Solids (wt) | Temp (°C.) | Filter Size (Microns) | Filtration Time (sec) |
| --- | --- | --- | --- | --- | --- |
| TEPA- | 1000 | 73 | 20 | 0.22 | 633 |
| TEPA | 1000 | 73 | 20 | 0.45 | 655 |
| TEPA | 1000 | 73 | 35 | 0.22 | 554 |
| TEPA | 1000 | 73 | 35 | 0.45 | 542 |
| TEPA | 1000 | 73 | 50 | 0.22 | 387 |
| TEPA | 1000 | 73 | 50 | 0.45 | 398 |

In comparison with Comparative Experiment 3, Example 13 demonstrates that significant reductions in filtration time are obtained with the use of the polyalkylene polyamine additive.

EXAMPLE 14

A blend of 25 percent (solids) SB Latex 233A, 25 percent TEPA, and 50 percent water is added to the slip at the level of 1000 ppm active (2000 ppm solution basis) with the following results:

| Add. ID* | Add. Level (ppm) | % Solids (wt) | Temp (°C.) | Filter Size (Microns) | Filtration Time (sec) |
| --- | --- | --- | --- | --- | --- |
| L/TEPA | 1000 | 73 | 20 | 0.22 | 926 |
| L/TEPA | 1000 | 73 | 20 | 0.45 | 925 |
| L/TEPA | 1000 | 73 | 35 | 0.22 | 730 |
| L/TEPA | 1000 | 73 | 35 | 0.45 | 740 |
| L/TEPA | 1000 | 73 | 50 | 0.22 | 540 |
| L/TEPA | 1000 | 73 | 50 | 0.45 | 533 |

*L = latex

While the reductions in filtration time are not as large for the blend as for the polyalkylene polyamine alone (Example 13), the filtration time reductions are significant (compare Comparative Experiment 3).

EXAMPLE 15

Various amine compounds are added to the slip at 1000 ppm with the following results:

| Add. ID[1] | Add. Level (ppm) | % Solids (wt) | Temp (°C.) | Filter Size (Microns) | Filtration Time (sec) |
|---|---|---|---|---|---|
| Pip | 1000 | 73 | 20 | 0.22 | 1323 |
| Pip | 1000 | 73 | 20 | 0.45 | 1344 |
| EDA | 1000 | 73 | 20 | 0.22 | 1116 |
| EDA | 1000 | 73 | 20 | 0.45 | 1104 |
| DETA | 1000 | 73 | 20 | 0.22 | 748 |
| DETA | 1000 | 73 | 20 | 0.45 | 772 |
| TETA | 1000 | 73 | 20 | 0.22 | 812 |
| TETA | 1000 | 73 | 20 | 0.45 | 805 |
| TEPA | 1000 | 73 | 20 | 0.22 | 633 |
| TEPA | 1000 | 73 | 20 | 0.45 | 655 |
| E-100 | 1000 | 73 | 20 | 0.22 | 608 |
| E-100 | 1000 | 73 | 20 | 0.45 | 626 |
| DEA[2] | 1000 | 73 | 20 | 0.22 | 1846 |
| DEA[2] | 1000 | 73 | 20 | 0.45 | 1829 |
| MEA[2] | 1000 | 73 | 20 | 0.22 | 1922 |
| MEA[2] | 1000 | 73 | 20 | 0.45 | 2008 |
| AEEA[2] | 1000 | 73 | 20 | 0.22 | 1527 |
| AEEA[2] | 1000 | 73 | 20 | 0.45 | 1642 |

[1] Pip = piperazine
EDA = ethylenediamine
DETA = diethylenetriamine
TETA = triethylenetetramine
TEPA = tetraethylenepentamine
E-100 = ethyleneamine E-100
DEA = diethanolamine
MEA = monoethanolamine
AEEA = aminoethylethanolamine
[2] Not an embodiment of the present invention Slips prepared with polyalkylene polyamine additives exhibit a reduction in filtration time, while slips prepared with alkanolamines do not.

COMPARATIVE EXPERIMENT 4

Not an embodiment of the present invention

Various binder materials are added to the slip at 1000 ppm (active basis), with the following results:

| Add. ID* | Add. Level (ppm) | % Solids (wt) | Temp (°C.) | Filter Size (Microns) | Filtration Time (sec) |
|---|---|---|---|---|---|
| Na 101 | 1000 | 73 | 20 | 0.22 | 1937 |
| Na 101 | 1000 | 73 | 20 | 0.45 | 1753 |
| L 233A | 1000 | 73 | 20 | 0.22 | 1457 |
| L 233A | 1000 | 73 | 20 | 0.45 | 1524 |
| P 4990 | 1000 | 73 | 20 | 0.22 | 1548 |
| P 4990 | 1000 | 73 | 20 | 0.45 | 1466 |
| P 4983 | 1000 | 73 | 20 | 0.22 | 1492 |
| P 4983 | 1000 | 73 | 20 | 0.45 | 1464 |

*Na 101 = Nalco 101
L 233A = SB Latex 233A
P 4990 = Primacor 4990
P 4983 = Primacor 4983

Slips prepared with the candidate binder materials and without polyalkylene polyamines do not induce reductions in filtration times (compare with Comparative Experiment 3).

COMPARATIVE EXPERIMENT 5

Not an embodiment of the present invention

Controls—No amine additives are used. The percent solids of the slips are varied with the following results:

| Add. ID | Add. Level (ppm) | % Solids (wt) | Temp (°C.) | Filter Size (Microns) | Filtration Time (sec) |
|---|---|---|---|---|---|
| — | 0 | 46 | 20 | 0.22 | 83 |
| — | 0 | 46 | 20 | 0.45 | 79 |
| — | 0 | 53 | 20 | 0.22 | 203 |
| — | 0 | 53 | 20 | 0.45 | 219 |
| — | 0 | 60 | 20 | 0.22 | 533 |
| — | 0 | 60 | 20 | 0.45 | 529 |
| — | 0 | 73 | 20 | 0.22 | 1365 |
| — | 0 | 73 | 20 | 0.45 | 1357 |

EXAMPLE 16

Tetraethylenepentamine is added to slips of various percent solids, with the following results:

| Add. ID | Add. Level (ppm) | % Solids (wt) | Temp (°C.) | Filter Size (Microns) | Filtration Time (sec) |
|---|---|---|---|---|---|
| TEPA | 630 | 46 | 20 | 0.22 | 38 |
| TEPA | 630 | 46 | 20 | 0.45 | 47 |
| TEPA | 726 | 53 | 20 | 0.22 | 82 |
| TEPA | 726 | 53 | 20 | 0.45 | 88 |
| TEPA | 822 | 60 | 20 | 0.22 | 178 |
| TEPA | 822 | 60 | 20 | 0.45 | 186 |
| TEPA | 1000 | 73 | 20 | 0.22 | 633 |
| TEPA | 1000 | 73 | 20 | 0.45 | 655 |

When compared to Comparative Experiment 5, slips containing the polyalkylene polyamine additive exhibit shorter filtration times. This observation is valid over a range of slips with varying concentrations of solids.

EXAMPLE 17

A blend of 25 percent (solids basis) SB Latex 233A, 25 percent TEPA, and 50 percent water is added to slips of various percent solids, with the following results (additive level is active basis, double for solution basis):

| Add. ID* | Add. Level (ppm) | % Solids (wt) | Temp (°C.) | Filter Size (Microns) | Filtration Time (sec) |
|---|---|---|---|---|---|
| L/TEPA | 630 | 46 | 20 | 0.22 | 70 |
| L/TEPA | 630 | 46 | 20 | 0.45 | 80 |
| L/TEPA | 726 | 53 | 20 | 0.22 | 166 |
| L/TEPA | 726 | 53 | 20 | 0.45 | 186 |
| L/TEPA | 822 | 60 | 20 | 0.22 | 298 |
| L/TEPA | 822 | 60 | 20 | 0.45 | 408 |
| L/TEPA | 1000 | 73 | 20 | 0.22 | 926 |
| L/TEPA | 1000 | 73 | 20 | 0.45 | 925 |

*L = latex

Use of the polyalkylene polyamine/binder blend results in reduction of filtration time for slips containing various levels of solids (compare with Example 16 and Comparative Experiment 5).

What is claimed is:

1. A slip composition comprising:
   (a) a slip medium;
   (b) a particulate material comprising ball clays and kaolin clays; and
   (c) an amount of a polyalkylene polyamine having an average molecular weight of less than about 1,000 effective to increase the cast rate of casting processes using the slip.
2. The composition of claim 1 further comprising an amount of a binder effective to maintain the green strength of articles prepared from the slip composition.
3. The slip composition of claim 1 wherein the amount of polyamine is from about 0.0001 to about 1 weight percent of the slip.
4. The slip composition of claim 3 wherein the polyalkylene polyamine is tetraethylenepentamine.
5. The slip of claim 2 wherein a styrenebutadiene latex is employed as the binder.
6. The slip composition of claim 5 wherein the polyalkylene polyamine is tetraethylenepentamine and the binder is a butadiene latex.

* * * * *